(No Model.)

F. N. CONNET.
CRANE.

No. 563,258.

8 Sheets—Sheet 1.

Patented July 7, 1896.

WITNESSES.
Andrew D. Paine.
G. E. Sawin.

INVENTOR.
Fredk. N. Connet.

(No Model.)  
8 Sheets—Sheet 3.

F. N. CONNET.
CRANE.

No. 563,258.  Patented July 7, 1896.

WITNESSES.  INVENTOR.

(No Model.)

F. N. CONNET.
CRANE.

No. 563,258.

8 Sheets—Sheet 4.

Patented July 7, 1896.

WITNESSES.

Andrew D. Paine.

G. E. Sawin

INVENTOR.

Fred. N. Connet.

(No Model.)  F. N. CONNET.  8 Sheets—Sheet 5.
CRANE.

No. 563,258.  Patented July 7, 1896.

WITNESSES.  INVENTOR.

Andrew D. Paine.  Fredk N. Connet.

G. E. Sawm.

(No Model.) 8 Sheets—Sheet 6.

F. N. CONNET
CRANE.

No. 563,258. Patented July 7, 1896.

WITNESSES. INVENTOR.

Andrew D. Paine.
G. E. Sawn.

Fred. N. Connet.

(No Model.)   8 Sheets—Sheet 7.

F. N. CONNET.
CRANE.

No. 563,258.   Patented July 7, 1896.

WITNESSES
Andrew D. Paine.
G. E. Sawin.

INVENTOR
Fred. N. Connet.

(No Model.)  F. N. CONNET.  8 Sheets—Sheet 8.
CRANE.
No. 563,258.  Patented July 7, 1896.
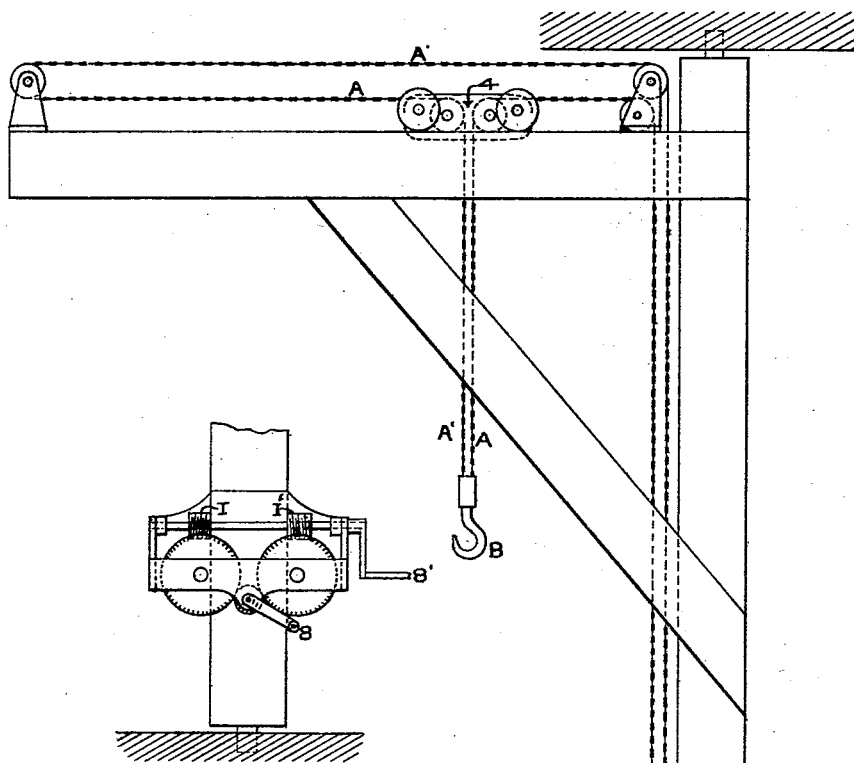
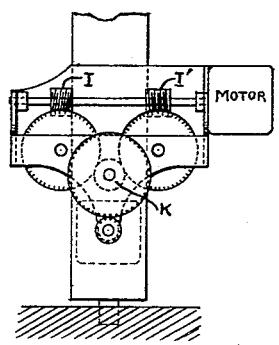
FIG 13
FIG 12
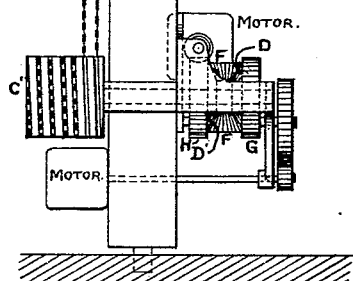
FIG 11
WITNESSES.  INVENTOR.
Andrew D. Paine  Fred'k N. Connet.
G. E. Sawin.

UNITED STATES PATENT OFFICE.

FREDERICK N. CONNET, OF PROVIDENCE, RHODE ISLAND.

CRANE.

SPECIFICATION forming part of Letters Patent No. 563,258, dated July 7, 1896.

Application filed September 7, 1894. Serial No. 522,345. (No model.)

*To all whom it may concern:*

Be it known that I, FREDERICK N. CONNET, a citizen of the United States, residing in the city and county of Providence and State of Rhode Island, have invented a new and useful Crane, of which the following is a full description.

Figure 1:
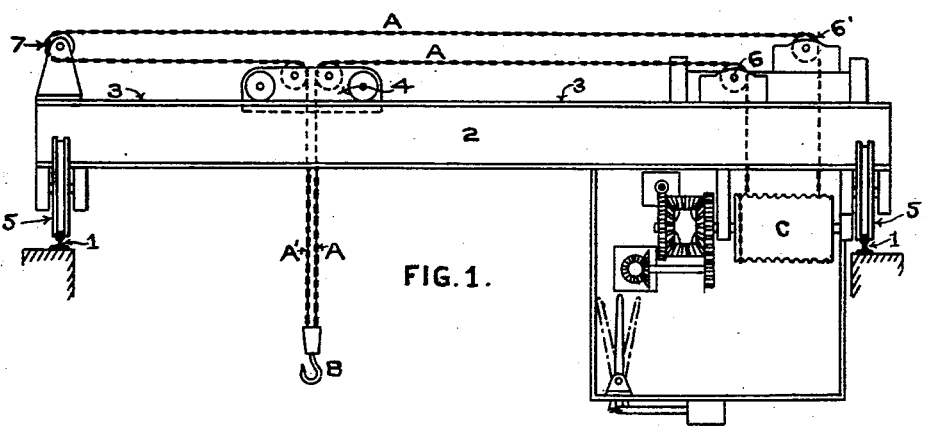
Figure 2:
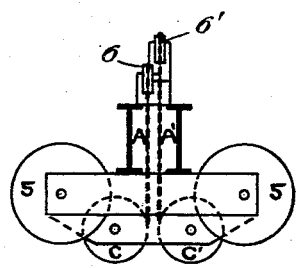
Figure 3:
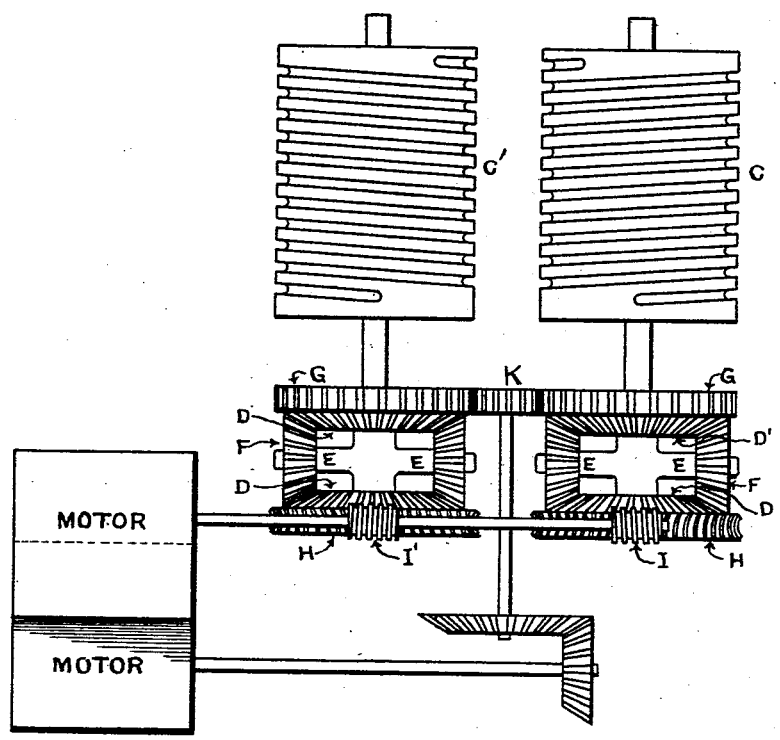
Figure 4:
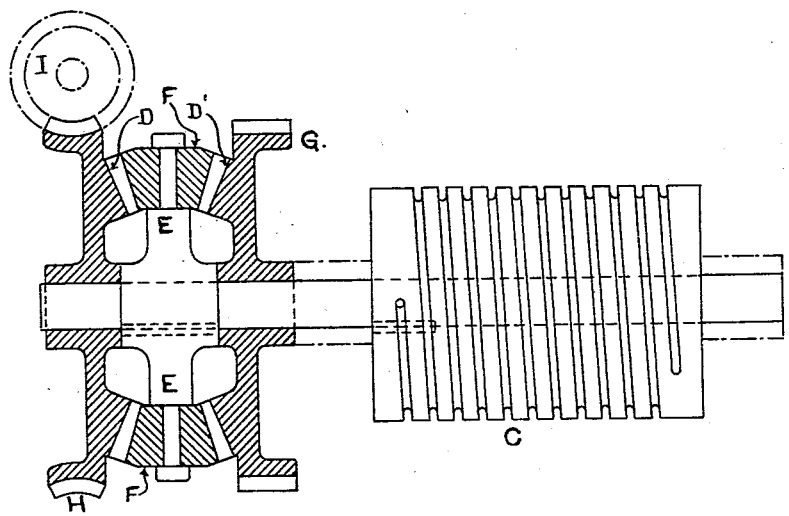
Figure 5:
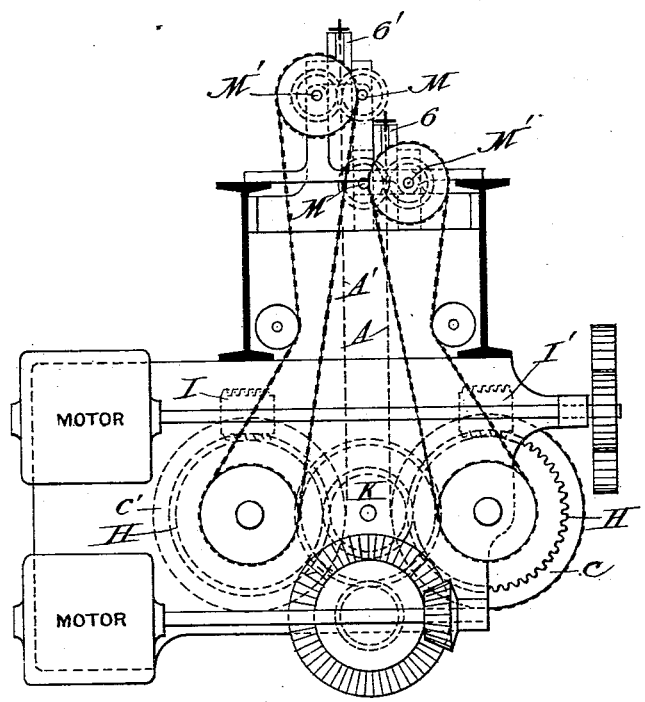
Figure 6:
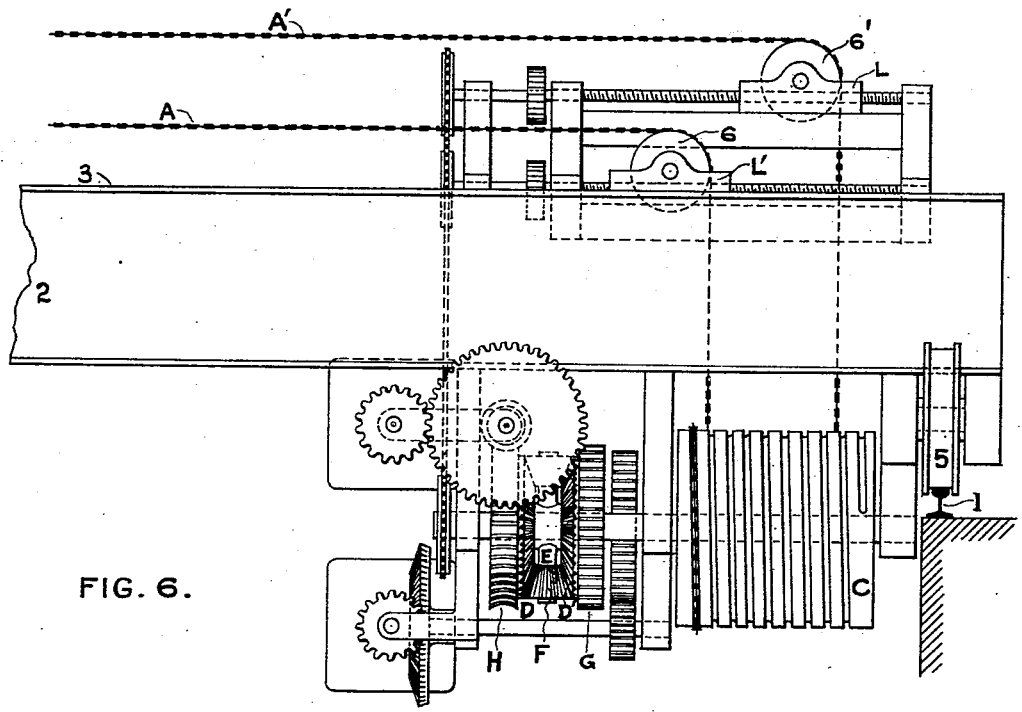
Figure 7:
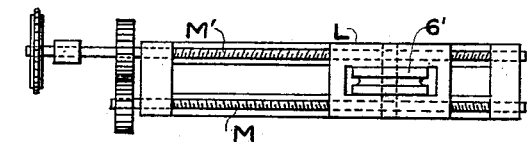
Figure 8:
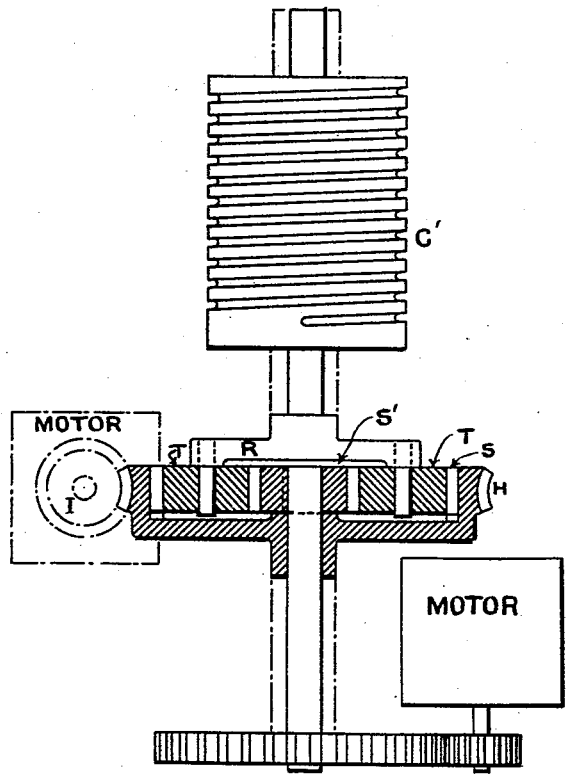
Figure 9:
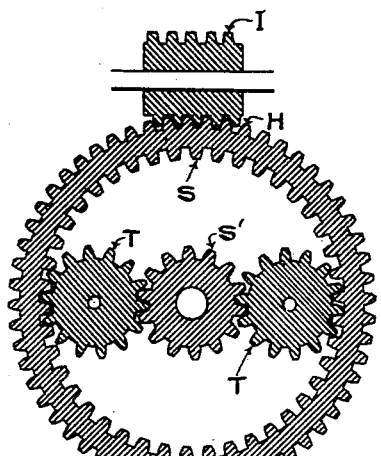
Figure 10:
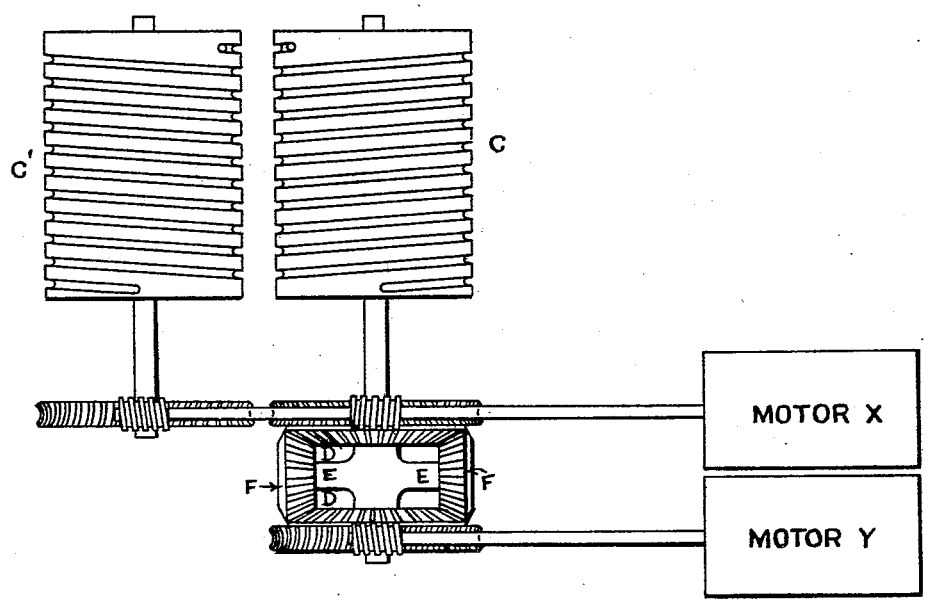

Referring to the drawings accompanying and hereby made a part of this specification, Figure 1 is an outline view of an ordinary traveling crane showing the position and general arrangement of the parts invented by me, immaterial parts being omitted. Fig. 2 is an end view of Fig. 1, showing the hoisting-drums and trolley-wheels, and is designed particularly to show how the chains are placed upon the drums. Fig. 3 is a plan view of the drums and the mechanism to operate them, and Fig. 4 is a detail of a part of the latter mechanism. Figs. 5 and 6 are respectively an end and side elevation of this same mechanism, and showing also the manner in which the chains are fed upon the drums, Fig. 5 representing the mechanism as it appears from the center of the bridge, leaving out the equational gearing in order to show clearly the construction of the feeding mechanism. Fig. 7 is a detail of a portion of this feeding mechanism. Figs. 8 and 9 show a modified construction, and Fig. 10 a modified arrangement, of the more material parts of my invention, and Figs. 11, 12, and 13 show the invention as applied to a jib-crane. This general description of these drawings will be sufficient, I think, with the more detailed references to them hereinafter contained, to make them fully understood.

My invention will be better understood if I first confine myself to a description of the specific construction employed in an electrically-operated overhead traveling crane, and proceed from that to point out forms of cranes to which it is exceedingly well adapted, and then pass to the broader and more generic features of my invention.

In a traveling crane, then, (see Fig. 1,) I make use of the side rails 1 1, lengthwise of the building or space covered by the crane upon which the bridge 2 of the crane runs, and the trolley 4, running upon rails or flanges 3 3 of the bridge constructed for that purpose, all constructed in the manner usual at the present time in such cranes. Three electric motors furnish the power, all preferably placed at one end of the bridge, being attached thereto, and operated from a platform under and also attached to one end of the bridge, as shown in Fig. 1. One of these motors is employed in the usual manner to cause the bridge to travel upon the side tracks by being connected by gearing to the wheels 5 5, upon which it rests, so as to drive them, and, since it forms no part of my invention and operates in the same manner as in other cranes, this motor may be dropped from our consideration without further mention. The other two motors are employed in causing the trolley, as hereinafter described, to travel on the bridge, the movement being hereinafter called "trolleying," and in hoisting, but are arranged in connection with the drums upon which the hoisting-chains are wound in a new and novel way, and it is in this construction that my invention largely, although not exclusively, consists.

Two chains A and A' may be used, arranged in their simplest form, as follows: Each has one end attached to a hook B or other suitable means to which to attach the load. Both chains then pass up over sheaves carried by the trolley 4, which trolley is merely a carriage suitably constructed to run upon the flanges of the bridge and carrying these two sheaves, one for each chain, and of a sufficiently substantial construction of course to adapt it to the work to be done. The other end of chain A passes from its sheave upon the trolley over another sheave 6 to and is attached to one of two hoisting-drums C, properly grooved to receive it; while chain A', after passing over its trolley-sheave, passes to the farther end of the bridge to and around a sheave 7 there located, and then back to and is attached to its own hoisting-drum C', (see Figs. 2 and 3,) which is by preference located near the other drum, C. I have heretofore, for the purpose of simplifying the construction of other parts, caused the chains to wind upon their respective drums in opposite directions, that is, one passing around from right to left and the other from left to right, as shown in Fig. 2 and by the direction of the grooves in many of the other figures. It is then very evident that if both drums be rotated in opposite directions at the same speed, the effect will be simply to raise or lower the hoisting-hook and the load attached thereto, while if the drums are rotated in the same direction and at equal speeds, the hook will not rise or fall, but will move horizontally, or, as it is frequently called, "trolley," one chain slacking off as the other is drawn in. Any difference in the speeds of the two drums, when turning either in the same or opposite directions, will evidently result in a movement of the hook combining both a perpendicular and a horizontal motion, that is, a diagonal movement in a vertical plane. The direction of this movement whether more toward the perpendicular or horizontal will depend upon the relative speeds of the two drums. In order to control the direction in which the hoisting-hook thus travels in all possible variations, I connect each of the two hoisting-drums C and C' to both the motors heretofore mentioned as used for hoisting and trolleying, as shown in Fig. 3, by interposing between the shafts of the drums and the shafts of the motors two sets of "equational gearing" (so called for reasons hereinafter specified) of the following construction.

Referring now more particularly to Figs. 3 and 4, there are mounted upon the shafts of each of the two drums two beveled gears D and D', of the same pitch diameter, but they are left to rotate freely upon the shafts without communicating motion to them. These gears are held in proper position by collars (not shown) or other mechanical means of ordinary construction. Between each set of these main "beveled" gears, as I will hereinafter call them to distinguish them from others, there is mounted upon each drum-shaft and rigidly attached thereto a framework containing the arms E, upon which are mounted so as to rotate freely one or more beveled pinions F, and the whole is so arranged that the pinion or pinions will mesh with both of the main beveled gears D and D'. This framework is not necessarily anything more than one or more arms attached to the shaft and carrying the pinion or pinions. Anything further is employed merely for strength, but the name "framework" is convenient as a distinguishing mark, however it may be specifically constructed.

Because the motion of the pinion or pinions is entirely controlled by the two main gears, and as the former, as it were, float between the latter, I have, in order to distinguish them, called them "floating" pinions. As I have heretofore constructed the main beveled gears, one in each set of gearing also carries upon its outer rim a set of spur-teeth, (shown at G,) and the other of them in each set carries upon its outer rim worm-teeth, (shown at H;) or, in either case, the same result may be attained by bolting rigidly to the main beveled gears ordinary spur and worm gears. The two worm-gears should be of the same diameter and of the same pitch, as also the two spur-gears, even if all four are not alike in these respects. Meshing with the worm-gear of each set are the worms I and I', both rigidly attached to the shaft of one of the motors, as shown in Fig. 3; and meshing with the spur-gear of each set is the pinion K, which may be rigidly fastened to the shaft of the other motor; but owing to the preferable position of the motor, I have heretofore interposed proper shafting and gearing between the two. In any event this pinion K is to be mechanically connected to the motor so as to be driven by it. The effect of this construction is as follows: It is evident that if either set of the main beveled gears, as connected the one with the other, either by means of the worm-gears and worms, or the pinion K on the motor-shafts, or geared therewith, remains stationary, and the other set is caused to rotate by the action of its motor, both drum-shafts will be caused to rotate, since these gears acting upon one side of the beveled floating pinions, while their other side is held stationary by the other set of beveled gears, will compel the floating pinions to roll upon the stationary set, and this action will force the arms forward and cause the shaft to which they are attached to rotate, although their speed will be only one-half the number of revolutions that the main beveled gears are running at the same time. Thus either motor alone will operate both drums. If now the hoisting-chains are wound upon the drums in the opposite directions, as before explained, the strains under any load upon them as transmitted by that set of beveled gears connected by the pinion K will offset each other, since the force tending to unwind the chains from both drums tends to rotate them and the pinion K between them in opposite directions. The pinion K must then stand still, and the result is that this set of the main beveled gears is always under this arrangement normally balanced, and when caused to rotate by the motor connected with the pinion K will rotate and cause the drums to rotate in the same direction, and thus cause one chain to be wound up while the other is unwound. The speed being always the same in each when this motor alone is running, the result under those circumstances is the trolleying movement only.

Turning our attention now to the other set of the main beveled gears, that with the worm-gears and connected by the shaft carrying the worms, it is evident that the relative direction of the rotation communicated to them by their motor will depend upon whether both worms are the same, that is, both right-handed or both left-handed, or are both different, that is, one right and the other left. In the arrangement here shown we have seen that the other motor acting through its pinion K rotates both drums in the same direction, and remembering that our object in this construction is to rotate both drums either in the same or in opposite directions at will, it is evident that we must make one of these worms right and the other left in order to attain our end and rotate the drums in opposite directions by means of said worms; but these worm-threads will evidently, as any worm-thread will, prevent the rotation of the worm-gears meshed with them, and the strain here also being in opposite directions, the two worms will again lock the main beveled gears and consequently the drums by offsetting the strain upon one against that on the other. At the same time, when their motor alone is put in motion, the drums will be rotated in opposite directions by means of the oppositely-cut worms, and the chains being also wound in opposite directions, the effect will be either to wind up or unwind both chains at the same time and at the same speed, and therefore to raise or lower the hook and the load attached thereto without any trolleying movement, the direction up or down being dependent upon the direction in which the motor is run. Thus we have here the required and simple means both for holding either set of main beveled gears stationary while the other is rotated, and means for hoisting with one motor and trolleying with the other; but it is not of course necessary to hold either one stationary unless it is so desired. Both may run at the same time, and at the same or any other speed which the motor and connecting gearing permits, and the direction taken by the hook B and its load will depend upon the direction of the rotation and the relative speeds of the two motors. Thus, for example, suppose both motors to run at such speeds as to rotate the main beveled gears to which they are respectively attached at equal speeds. In one set of the equational gearing the two main beveled gears will rotate in opposite directions, and because running at the same speeds the effect upon the floating beveled pinions between them will be to rotate them only upon their axes without giving them any other movement; that is, the arms to which they are attached and consequently the shaft and drum will stand still unaffected; but the main beveled gears in the other set of equational gearing will both run in the same direction and consequently the floating pinion or pinions between them will act as a pin or stay and revolve the shaft and drum at an equal speed. The result will be that one chain will remain stationary and the other wound or unwound, and consequently both chains being rigidly attached to the hook B the latter and the load it carries will take a diagonal direction in a vertical plane of forty-five degrees from the horizontal. Any difference in the speeds of the two motors will only change the direction taken. It will thus be seen that the motion resulting to the intermediate framework carrying the floating pinions is the equation of the motions given to the main gears, and hence the name of "equational gearing." Although it may not in every specific construction be an exactly appropriate name, there seems to be none more accurately descriptive of them, and I have therefore employed it; but I do not by its use mean to limit myself to gearing which will effect the result of transmitting motion in amount the equation of other motions applied, but mean to include within the term any system of gearing of essentially the same construction as that herein described. It only remains to control the direction in which the motors run and their speeds, in order to give every possible combination of movement to the hook and load which the capacities of the motors permit; and this is readily done by means of rheostats and any of the usual means for reversing the motors, where electricity is used, or by well-known mechanical arrangements, where other motive power is employed. I have heretofore used the levers shown in Fig. 1 to control these, the direction in which they are moved from the perpendicular, either forward or backward, controlling the direction in which the motor connected with that lever runs, and the distance it is moved operating the rheostat. These connections, being outside my invention and being well understood by those versed in electrical matters, need no further description here.

Many simple modifications of these sets of equational gearing are manifestly possible without materially changing its action. Thus in place of the spur-pinion K to drive one set of the main beveled-gears, worms and worm-gears may be substituted; and in like manner a spur-pinion may be substituted for the worms in the place where they are here shown, only in order to preserve in that case the proper direction of the rotation, the two outer gears thus becoming spur-gears must mesh together, and the pinion drive one of them only, or some other equivalent arrangement be employed to cause them to rotate in opposite directions. Another modification, however, would in this last case be necessary, namely, some means to prevent the gears rotating under the strain of the hoisting-chains and any load, when the motor is not in action, since in this instance the pinion does not lock the two sets so that they balance one another. Although this rotation could be prevented by brakes or other contrivances, I have preferred the worms as the simplest and most effective.

It will now be seen why I prefer to wind the chains upon the drums in opposite directions; for it is evident that this permits the placing of the strain upon one drum against that upon the other by means of the pinion K meshing in the gears of both sets, and thus readily permits of the use of one set of spur-gearing throughout, which is always more economical, both to build and in expenditure of power, than worm-gearing.

It is evident to any mechanic that whenever for the purpose of reducing the speed of the motors or for any other purpose it is advisable, the worms need not be mounted upon the motor-shaft, but may have a separate shaft of their own, with proper gearing interposed between the two. So, also, between each set of equational gearing and its drum mounted upon a separate shaft, it may be frequently advisable to interpose gearing for the sake of power or for other purposes; and, in fact, I have heretofore made use of such intermediate gearing, as is shown in Figs. 5 and 6.

I have thus far described my invention as applied in an electrically-operated traveling crane; but unlike most, if not all, other cranes operated by electricity, my invention is well adapted to jib-cranes, as shown in Figs. 11, 12, and 13. Most other electrical cranes have one and generally two heavy motors and drums mounted upon the trolley, one motor being employed for hoisting and the other for moving the trolley. This great weight, of comparatively little consequence when mounted upon the bridge of a traveling crane supported at each end, becomes exceedingly objectionable when mounted upon the horizontal arm or boom of a jib-crane, which is firmly supported at one end only. With my invention, however, it is entirely immaterial to the working of the crane where the drums and motors are placed, and they can as well be located near the foot of the mast and attached thereto, so as to rotate therewith, as shown in Fig. 11, as anywhere else, the chains being conducted to the drums over proper sheaves. The trolley I employ is no heavier than is necessary to support the chain-sheaves properly, which is always very small compared with the weight to be carried by the crane, while in the other forms the great weight of the trolley in itself constitutes a large load for the crane.

It was stated in the opening of this description that the simplest way of arranging the chains was to attach one end of each to the hoisting-hook and the other end of each to its own drum; but in practice I have used one continuous chain attached to the two drums at either end and passed it under a sheave attached to the hoisting-hook, but have keyed the sheave so as not to turn. Thus keyed there is too much friction to permit the chain to so slip as to prevent the trolleying in any way it may otherwise be accomplished; but this arrangement has this advantage, that it will upon occasion permit the chain to slip under sudden strains upon the hoisting-hook and thus relieve the chain. If it gets in this way too far from the center of the chain at any time, it can be easily slipped back by running the trolley up to one end of the bridge and continuing to run the drums in the same direction to force the chain to slip in the opposite direction. Again, either end of a single chain may be attached to the hoisting-hook, and then run over sprocket-wheels in place of drums, the slack from either wheel supplying chain to run out over the other. Sprocket-wheels are sometimes employed in such cranes, but drums are preferable, since sooner or later the wheels and chain wear and do not fit well together. No matter how the chain may be arranged, I have referred to it in the plural as two chains, since in this invention it becomes virtually two in its action. It is evident also that the chains may be rove through blocks attached respectively to the trolley and the hoisting-hook without interfering with the trolleying action, and thus permit the use of smaller chains than would otherwise be practicable. Wire or other rope may of course replace the chains in these various arrangements, except in the case of the use of sprocket-wheels, without changing the character of my invention; and, as stated, sprocket-wheels are equivalents for the drums.

A hoisting-drum placed transversely to the bridge of a traveling crane is objectionable, unless some means for guiding the chain or rope upon it is employed, particularly where one end of the chain only is wound at a time, since the chain is led upon it during the larger part of the time at a more or less oblique angle, and when the trolley is close to the drum, unless the latter is placed so that one of its ends is coincident with the center of the bridge, this angle becomes very objectionable. Therefore, I prefer to arrange my drums, particularly that winding the chain A, which does not first pass to the farther end of the bridge, so that their longitudinal axes will be in the central vertical plane lengthwise of the bridge or parallel and as near thereto as practicable. In this way the chains are always kept practically in the same central plane; but in this construction some means is evidently required to feed the chains upon the drums, and the construction employed is that shown in Figs. 5, 6, and 7. In this carriages L and L', one for each drum, carrying the sheaves 6 and 6', over which the chains or ropes pass, are mounted each upon two screws M and M', the screws passing through screw-threads cut in the carriages L and L' or through nuts attached thereto; or in place of the two screws, guide-rails and one screw may be used. The screws are then rotated by sprocket-wheels attached to them and chains passing also over other sprocket-wheels attached to the drums, each being thus connected with its own drum, and the parts being so proportioned that the carriage will travel at a speed proper for feeding the chain or rope upon the drum.

The use of electric motors is generally most advantageous in power-cranes, where there is a convenient supply of electricity, particularly since they start slowly, and gradually acquire greater speed; and in this invention the absolute speed at which either moves is of little consequence; it is the relative speed of the two that determines the result. But very evidently other motive power may be employed in place of electricity without affecting the invention. Thus any sources of mechanical power may be used by employing suitable gearing or belting; and, further, particularly when applied to jib-cranes, hand-power may be substituted, as shown by the cranks 8 and 8' in Fig. 13. Possibly the advantages of my invention in this latter connection deserve a word or two of explanation. In the old-fashioned jib-crane, worked by hand, it was customary to use a single chain, one end of which was attached to the outer end of the horizontal arm of the crane, and the other end was brought back, down over the sheave of the trolley, through another sheave attached to the hook, back over a second sheave on the trolley, and thence passing over a sheave on the mast, down to the drum located at the foot of the mast. The drum was used exclusively for hoisting, a ratchet or other mechanism holding it against the weight of the load when the latter was not being raised or lowered; and an entirely separate mechanism was employed for trolleying. The result of this arrangement where, as commonly was the case in cranes for heavy work, the hoisting-chain was rove several times through blocks attached to the trolley and hook, was that the trolleying was accomplished only with very great difficulty, the friction of the chain in running through the blocks being very great. With my arrangement it is evident that the trolleying is easily accomplished even though the chains are rove through many blocks; and another great advantage is that the cranks may be dropped at any instant and in any position without attention to any ratchet or other brake apparatus, the entire mechanism balancing itself at all times and with any load suited to its capacity. Besides this perfect balance of the apparatus, there is also this great advantage in connecting both sources of power, whether electric motor, or any other form of mechanical, as distinguished from hand, power, with both drums in place of connecting each source with its own drum only, namely, that it is practically impossible so to control the relative speeds in the latter case of the two sources, particularly in the use of electric motors, as to cause them to run properly, for under those circumstances for either hoisting or trolleying both must run at the same speed, and this cannot in ordinary practice be accomplished readily; but with my invention, although both drums are run in either case, they always run at the same speed when either motor is alone used, since they are both connected with the motor by similar gearing. Thus the direction taken by the hook and its load is absolutely within control without any nice and impracticable regulation of the relative speeds of the motors. With hand-power the perfect balance of the apparatus and convenience in trolleying are the main advantages, since ordinarily in such cases the hoisting and trolleying would each be accomplished at different times and not together.

Having described the specific construction of my invention which I prefer, as applied both to traveling and jib cranes, it remains for me to point out in what I consider my invention consists broadly and generically. If we look at the arrangement of the crane hereinbefore described in the broadest sense, it is evident that it consists of two hoisting-drums or their equivalents and proper hoisting-chains or their equivalents, said drums being rotatable either in the same or in opposite directions, as desired. This arrangement without reference to the manner in which the power is applied to the drums will accomplish the end sought; but hoisting-cranes have been heretofore constructed in this way, and I cannot therefore claim this as my invention; but, so far as I know, no one has ever before connected both of the drums to each of two motive powers by means of permanent connections always in operative position, the connections being so constructed that one motive power will rotate both drums in the same direction and the other motive power will rotate both in opposite directions, and I therefore regard this and the subcombinations constituting it as my inventions. Further, it is not necessary to construct the gearing, herein called "equational gearing," in the manner thus far pointed out, in order to accomplish the same result.

There appear to be two essential features of this gearing ever present; namely, first, that the two main gears shall each mesh with the floating pinions carried by the framework, and, second, that the two main gears of the framework shall always be concentrically mounted, in order that the floating pinions may always mesh with the main gears around their entire circumferences; but there is at least one other construction which will preserve these features. Thus in place of beveled gears, the same result may be attained in essentially the same way with spur-gearing by means of the construction shown in Figs. 8 and 9, where S represents a gear with internal spur-teeth and S' a smaller spur-gear with external teeth. Between the two gears and meshing with both are one or more pinions T, carried by the framework R, which is practically the same as the framework E of the other drawings. The two gears and this framework R are concentrically mounted; or the pinions might in this instance be readily mounted upon spindles inserted in the end of the drum and this latter be concentrically mounted with the gears. In such a case a separate framework for the floating pinions is not required. By applying the power of the motors to the inner and outer gears, which may be readily done in various ways evident to any mechanic, we have a construction of spur-gearing to accomplish the same result in essentially the same way as the beveled gearing before shown. There may also be other ways of constructing this gearing, but the essential features pointed out above must remain the same.

It is not absolutely necessary that both drums or their equivalents be connected with both sources of power. Thus in Fig. 10 one drum is shown connected with one of the motors only, and the other drum with the same and a second motor by means of one set of the equational gearing. It is at once evident that all the combinations of movements can be obtained by means of this arrangement, by running the motors at different relative speeds, since motor Y can easily be run either slower or faster than motor X, and in the same or the reverse direction as desired, and the drum C' will rotate only by the equational result of the two. In this case it is preferable, of course, to employ worms and worm-gearing to connect the motors with the equational gearing, since there is here no balancing of the strain upon one drum by that upon the other, and any other form of gearing for connecting them would require brakes or some other like mechanism to hold the drums under the strain upon them. As before stated, there is at least one other way of combining gearing of this general construction with the mechanism of a crane. My object here has been merely to show that it could, if desired, be used with one drum only; but although it can be so used, I decidedly prefer to employ it with both drums, as hereinbefore described.

In the following claims the words "hoisting hook" are meant to include all means of attaching the load to the chains or their equivalents.

What I claim is—

1. In a crane, the combination of two sets of equational gearing, and two independent motor-shafts each connected to one of the main gears of each set of gearing by connections properly constructed to enable one shaft to rotate the main gears with which it is connected in the same direction and to enable the other shaft to rotate the other main gears in opposite directions, substantially as described.

2. In a crane, the combination of two sets of gearing, each consisting of two main gears, a framework, and one or more pinions rotatably mounted upon said framework, each of said gears meshing with said pinion or pinions, and said gears and framework being concentrically mounted, with a shaft transmitting motive power, means by which said shaft is connected with one of the main gears in each of said sets of gearing and properly constructed to rotate said main gears in the same direction, a second shaft also transmitting motive power, and means by which said second shaft is connected with the other main gear in each of said sets of gearing and properly constructed to rotate the main gears thus operated by said second shaft in opposite directions, substantially as described.

3. In a crane, the combination of two sets of gearing, each consisting of two main gears, a framework, and one or more pinions rotatably mounted upon said framework, each of said gears meshing with said pinion or pinions, and said main gears and framework being concentrically mounted, with a shaft transmitting motive power, a spur-pinion operated by said shaft, two spur-gears each connected with one of the main gears in each of said sets of gearing and each meshing with said spur-pinion, a second shaft also transmitting motive power, two oppositely-threaded worms operated by said second shaft, and two worm-gears one connected with the other of said main gears in each of said sets of gearing and each of said worm-gears meshing with one of said worms, substantially as described.

4. In a crane, the combination of a drum, a set of equational gearing connected to the drum to drive it, and two independent sources of motive power each connected with the equational gearing, substantially as described.

5. In a crane, the combination of a drum, two independent motor-shafts, a set of gearing consisting of two main gears each connected with one of said power-shafts, a framework which is connected with said drum, and one or more pinions rotatably mounted upon said framework, each of said gears meshing with said pinion or pinions, and said gears and framework being concentrically mounted, and independent gearings by which each of said shafts is connected with one of said main gears, substantially as described.

6. In a crane, the combination of two drums, a hoisting-hook, chains connecting each of said drums with said hook, and a set of gearing consisting of two main gears, a framework which is connected with one of said drums, and one or more pinions rotatably mounted upon said framework, each of said gears meshing with said pinion or pinions, and said main gears and framework being concentrically mounted, with a shaft transmitting motive power and connected with one of said main gears and with the other drum, and a second shaft also transmitting motive power and connected with the other of said main gears, substantially as described.

7. In a crane, the combination of two drums, a hoisting-hook, chains connecting each of said drums with said hook, two sets of gearing each connected to one of the drums to drive it, and two independent motor-shafts each connected to both of said sets of gearings by connections properly constructed to enable one shaft to rotate both drums in the same direction and to enable the other shaft to rotate both drums in opposite directions, substantially as described.

8. In a crane, the combination of two drums, a hoisting-hook, chains connecting each of said drums with said hook, and two sets of gearing, each consisting of two main gears, a framework, the framework of each set of gearing being connected with one of said drums, and one or more pinions rotatably mounted upon said framework, each of said main gears meshing with said pinion or pinions, and said gears and framework being concentrically mounted, with a shaft transmitting motive power, means by which said shaft is connected with one of said main gears in each of said sets of gearing and properly constructed to rotate said main gears in the same direction, a second shaft also transmitting motive power, and means by which said second shaft is connected with the other main gear in each of said sets of gearing and properly constructed to rotate the main gears thus operated by said second shaft in opposite directions, substantially as described.

9. In a crane, the combination of two drums, a hoisting-hook, chains connecting each of said drums with said hook, and two sets of gearing, each consisting of two main gears, a framework, the framework of each set of gearing being connected with one of said drums, and one or more pinions rotatably mounted upon said framework, each of said gears meshing with said pinion or pinions, and said gears and framework being concentrically mounted, with a shaft transmitting motive power, a spur-pinion operated by said shaft, two spur-gears each connected with one of the main gears in each of said sets of gearing and each meshing with said spur-pinion, a second shaft also transmitting motive power, two oppositely-threaded worms operated by said second shaft, and two worm-gears each connected with the other of said main gears in each of said sets of gearing and each of said worm-gears meshing with one of said worms, substantially as described.

10. In a crane, the combination of two drums, a hoisting-hook, chains connecting each of said drums with said hook and arranged to wind upon said drums in opposite directions, two sets of gearing, each consisting of two main gears, a framework, the framework of each set of gearing being connected with one of said drums, and one or more pinions rotatably mounted upon said framework, each of said gears meshing with said pinion or pinions, and said gears and framework being concentrically mounted, with a shaft transmitting motive power, a spur-pinion operated by said shaft, two spur-gears each connected with one of the main gears in each of said sets of gearing and each meshing with said spur-pinion, a second shaft also transmitting motive power, two oppositely-threaded worms operated by said second shaft, and two worm-gears each connected with the other of said main gears in each of said sets of gearing and each of said worm-gears meshing with one of said worms, substantially as described.

11. In a crane, the combination of two drums, a hoisting-hook, chains connecting each of said drums with said hook, two electric motors, and two sets of gearing, each set connecting one of said drums with both of said motors, and said sets of gearing being properly constructed to enable one of said motors to rotate both of said drums in the same direction, and to enable the other motor to rotate both drums in opposite directions, substantially as described.

12. In a crane, the combination of two drums, a hoisting-hook, chains connecting each of said drums with said hook, and two sets of gearing, each consisting of two main gears, a framework, the framework of each set of gearing being connected with one of said drums, and one or more pinions rotatably mounted upon said framework, each of said main gears meshing with said pinion or pinions, and said gears and framework being concentrically mounted, with an electric motor, means by which said motor is connected with one of the main gears in each of said sets of gearing and properly constructed to rotate said main gears in the same direction, a second electric motor, and means by which said second motor is connected with the other main gear in each of said sets of gearing and properly constructed to rotate the main gears thus operated by said second motor in opposite directions, substantially as described.

13. In a crane, the combination of two drums, a hoisting-hook, chains connecting each of said drums with said hook, and two sets of gearing, each consisting of two main gears, a framework, the framework of each set of gearing being connected with one of said drums, and one or more pinions rotatably mounted upon said framework, each of said gears meshing with said pinion or pinions, and said gears and framework being concentrically mounted, with an electric motor, a spur-pinion operated by said motor, two spur-gears each connected with one of the main gears in each of the sets of gearing and each meshing with said spur-pinion, a second electric motor, two oppositely-threaded worms operated by said second motor, and two worm-gears each connected with the other of said main gears in each of said sets of gearing and each of said worm-gears meshing with one of said worms, substantially as described.

14. In a crane, the combination of two drums, a hoisting-hook, chains connecting each of said drums with said hook and arranged to wind upon said drums in opposite directions, two sets of gearing, each consisting of two main gears, a framework, the framework of each set of gearing being connected with one of said drums, and one or more pinions rotatably mounted upon said framework, each of said gears meshing with said pinion or pinions, and said gears and framework being concentrically mounted, with an electric motor, a spur-pinion operated by said motor, two spur-gears each connected with one of the main gears in each of said sets of gearing and each meshing with said spur-pinion, a second electric motor, two oppositely-threaded worms operated by said second motor, and two worm-gears each connected with the other of the main gears in each of said sets of gearing and each of said worm-gears meshing with one of said worms, substantially as described.

15. In a traveling crane, the combination of a drum whose longitudinal axis is placed lengthwise of the bridge of said crane and near the transverse center thereof, a trolley, a hoisting-chain, and mechanism for feeding said chain upon said drum, said mechanism being mechanically connected with said drum so as to be operated by it, substantially as described.

16. In a crane, the combination of two drums, a hoisting-hook, chains connecting each of said drums with the hook, a set of equational gearing connected to one of the drums to drive it, and two independent motor-shafts both of which are connected with the set of equational gearing, and one of which is also connected to the other drum, substantially as described.

FREDK. N. CONNET.

Witnesses:
F. C. HODGMAN,
ANDREW D. PAINE.